US012374312B2

(12) United States Patent
Sinkunas

(10) Patent No.: US 12,374,312 B2
(45) Date of Patent: Jul. 29, 2025

(54) KEYBOARD BAG FOR A KEYBOARD-PERCUSSION INSTRUMENT

(71) Applicant: UAB IMPROVIBRACIJA, Vilnius (LT)

(72) Inventor: Marius Sinkunas, Vilnius (LT)

(73) Assignee: UAB IMPROVIBRACIJA, Vilnius (LT)

( * ) Notice: Subject to any disclaimer, the term of this patent is extended or adjusted under 35 U.S.C. 154(b) by 120 days.

(21) Appl. No.: 18/267,308

(22) PCT Filed: Dec. 7, 2021

(86) PCT No.: PCT/IB2021/061395

§ 371 (c)(1),
(2) Date: Jun. 14, 2023

(87) PCT Pub. No.: WO2022/130119

PCT Pub. Date: Jun. 23, 2022

(65) Prior Publication Data

US 2024/0054980 A1 Feb. 15, 2024

(30) Foreign Application Priority Data

Dec. 15, 2020 (LT) ...................................... 2020 564

(51) Int. Cl.
*A45C 3/00* (2006.01)
*G10D 13/08* (2020.01)
*G10G 7/00* (2006.01)

(52) U.S. Cl.
CPC ............. *G10G 7/005* (2013.01); *G10D 13/08* (2013.01)

(58) Field of Classification Search
CPC . G10G 7/005; G10G 5/00; B25H 3/00; A45C 11/26; A45C 3/00; A45C 13/02; A45C 7/0095; A45C 3/004

(Continued)

(56) References Cited

U.S. PATENT DOCUMENTS 1,575,960 A 3/1926 Bartholomae
D164,702 S 10/1951 Montz (Continued)

FOREIGN PATENT DOCUMENTS

GB 2564440 A 1/2019
JP 2008090095 A 4/2008

(Continued)

OTHER PUBLICATIONS

Pearl Drums, Adams Percussion, Marimbas, accessed at <https://pearldrum.com/products/adams/marimbas/> on Jul. 21, 2023, 4 pages.

(Continued)

*Primary Examiner* — King M Chu
(74) *Attorney, Agent, or Firm* — Koivula & Somersalo, LLC

(57) ABSTRACT

The present invention is a keyboard bag for a percussion keyboard instrument (vibraphone, marimba, xylophone, metallophone, glockenspiel, or the like) for safe operation and transportation of the keyboard, which is the most essential and expensive component of instruments of this class. Unlike known bags for a similar purpose, this bag uses special internal bar tabs which, when placed on the keyboard, are inserted into the gaps between adjacent bars, thus separating them and preventing them from coming into mutual contact, under various operating and transporting conditions. This bag helps to protect the keyboard of the instrument from unwanted physical impact and damage and provides for more convenient and efficient mounting and unmounting of the keyboard during assembly and disassembly of the instrument.

10 Claims, 3 Drawing Sheets

(58) Field of Classification Search
USPC ............... 383/39; 224/223; 84/453; D3/299; 206/373, 314, 523
See application file for complete search history.

(56) References Cited

U.S. PATENT DOCUMENTS

| | | | | |
|---|---|---|---|---|
| 3,138,986 A | | 6/1964 | Musser | |
| 4,334,612 A | * | 6/1982 | Beato | A45C 5/14 229/87.01 |
| 4,411,187 A | | 10/1983 | Roper et al. | |
| 5,117,724 A | * | 6/1992 | Gardner | G10D 13/12 84/421 |
| 8,669,452 B2 | * | 3/2014 | Waitzman, III | G10D 13/02 84/411 R |
| 9,406,287 B2 | | 8/2016 | Glowka | |
| 10,325,577 B1 | | 6/2019 | Melhart | |

FOREIGN PATENT DOCUMENTS

| | | |
|---|---|---|
| JP | 6579130 B2 | 9/2019 |
| KR | 101961243 B1 | 3/2019 |

OTHER PUBLICATIONS

Anonymous: “Amazon.com: Orff Soprano Xylophone with Resonator, 16 fiberglass keys, 2 pairs of mallets : Musical Instruments”, Oct. 19, 2019 (Oct. 19, 2019), XP055892613, Retrieved on Jul. 21, 2023 at <https://www.amazon.com/Soprano-Xylophone-Resonator-fiberglass-mallets/dp/B07ZBJCT2H>.

Anonymous: “Thomann Marimba Bar Carry Bag 3,4 Set—Thomann Nederland”, Sep. 1, 2020 (Sep. 1, 2020), XP055892624, Retrieved on Jul. 21, 2023 at <https://www.thomann.de/nl/thomann_marimba_bar_carry_bag_set.htm>.

* cited by examiner

KEYBOARD BAG FOR A KEYBOARD-PERCUSSION INSTRUMENT

CROSS REFERENCES

This application is a U.S. national stage application of international patent application number PCT/IB2021/061395, filed on Dec. 7, 2021, claiming priority to Lithuanian national application number LT2020 564 filed on Dec. 15, 2020.

FIELD OF INVENTION

The present invention belongs to the technical field of equipment of musical instruments and their accessories. Specifically, it is a special bag for covering, protecting, packing, and safely transporting the keyboard of a keyboard-percussion instrument, such as the vibraphone or the marimba.

BACKGROUND ART OF INVENTION

Means of storage and transportation of musical instruments is an important technical area. Many musical instruments are large, heavy, and sensitive to physical and environmental conditions and impacts. In addition, instruments of high quality, made by well-known craftsmen and used for professional performance are expensive. On the other hand, the concert activities of professional music performers are inseparable from transportation, use, and storage of musical instruments during travel and sometimes in unforeseen conditions, which occasionally can be harmful or even disastrous for the instrument.

Each class of musical instruments has specialized technical solutions and tools that provide the best protection for that particular class or even a specific type of instrument. The present invention relates to protection means for keyboard-percussion instruments. Several instruments are included in the class of keyboard-percussion instruments: vibraphone, marimba, xylophone, metallophone (glockenspiel), bells, and the like.

A keyboard-percussion instrument usually comprises an instrument stand (frame), a set of percussion bars (plates) ("keyboard"), and percussion tools, usually mallets with soft tips. Different instruments of this class may also have additional sound-forming elements, such as the vibraphone and the marimba having resonators that amplify the sound emitted by the percussion bar as well as form the sound timbre and other characteristics. The aforementioned percussion bars are the essential elements of these instruments, where the sound of the instrument is created when the soft tips of the mallets are used to hit the bars of the keyboard. Depending on the type of the instrument, the percussion bars can be made of metal, wood, ceramic, plastic, or other materials suitable to generate the sound.

The vibraphone or marimba bar, which looks like a simple plate, actually has a special design and is made with great precision. For example, vibraphone bars are made of an aluminum or metal alloy (or a silver alloy) cut into plates of a predetermined length. In the plates, across their width, two holes are drilled through which the bars are strung into the keyboard by strings, and then the keyboard is hung with these strings on the holders in the frame of the instrument, thus allowing the bars to hang and sound free. The hanging bars are separated from each other, usually at regular intervals. To obtain a longer sound of the bars (self-resonance), said holes are drilled through the nodal points of minimum amplitude around which the plate vibrates. These points are approximately at ¼ of the length of the plate from each end of the plate. Besides, the vibraphone or marimba bar has an arch shape on its underside to lower the ringing frequency: it allows to shorten the largest bass bars. Moreover, this arch gives the bar a complex harmonic vibration mode and a specific soft sound, for example, the F3 bar sounds in the main F3 tone, along with the F5 and A6 consonants. In addition, due to the curvature of the arch, the said nodal points are displaced closer to the ends of the bar (22.4% of the length from each end of the plate). After the bar plate is made, its sound is tuned with precision. If the shape of the bar is flat, the ringing is adjusted by scraping/sanding the metal from the ends of the bar. Additionally, secondary and tertiary bar tones can be tuned by scraping/sanding the material in various other locations (arches) of the bar-plate.

Similar principles apply to the production of the Marimba bars. The essential difference is that the marimba bars are made of wood, usually expensive rosewood.

All this determines, that the bars and keyboards of the mentioned instruments are rather complex; they create the sound of the instrument and constitute a significant part of the price of the instrument. Meanwhile, transporting the instrument, careless use or even a slight physical shock (for example, mutual collisions of bars in the keyboard during transportation) can significantly degrade the sound of the instrument and the instrument may even be no longer suitable for professional performance.

There are several cases for storing and transporting percussion-keyboard instruments, which accommodate the whole instrument or only its keyboard, on the market. The closest source to the present invention is the Yamaha Soft Cases for YM-5100A Marimba [1]. It provides a set of cases, in which the wooden plates of the marimba bars are laid down side by side to each other, on a flexible fabric-made pallet which then is rolled into a roll together with the plates and fastened. Depending on the instrument type, if the bar weights are small, then harmful physical effects during transporting the keyboard are unlikely. However, when transporting a much heavier metal vibraphone keyboard, the case of this design may be not protecting from stronger collisions bars with other parts of the instrument or with other bars.

The company "Pearl" [2] accommodates the marimba keyboard into a case together with the instrument frame. However, even after the instrument has been packaged into the case, it still must be handled with care as the risk of damage remains significant.

Among patent sources, one can find patents on keyboard-percussion instruments, as well as on various bags and holders for musical instruments, for example, in documents U.S. Pat. Nos. 1,575,960, 3,138,986A, 4,411,187A, 164,702S, "Portable component marimba" in U.S. Pat. No. 9,406,287B2, "Support post for a suspended tone bar" in GB2564440A, "Musical instrument stand" in JP6579130B2, "Folding marimba" in U.S. Pat. No. 10,325,577B1, and others. However, an essentially close patent document on such percussion bars bags was not found.

The reviewed technical documentation shows that bags for transporting, operating, and storing a percussion keyboard may not be safe enough, especially, if the percussion keyboard is larger, heavier, and more expensive. The present invention discloses a bag of improved construction that allows the bars of a keyboard-percussion instrument to be stored, transported, and operated much more safely.

SUMMARY OF THE INVENTION

The purpose of the invention is to effectively protect the keyboard and bars of a keyboard-percussion instrument (vibraphone, marimba, xylophone, and the like) during operation, transportation, or long-term storage of the instrument.

The technical solution is a percussion keyboard bag of special construction, which, unlike other known made-of-fabric and padded keyboard bags for this purpose, additionally comprises special (fabric and padded) bar-separating tabs attached inside the bag, which, when the bag is used to cover the keyboard, are inserted into the gaps between the bars, thus separating the bars and preventing them from coming into direct contact under various operating and transporting conditions.

Effect: in this bag, each percussion bar is separated from each other by the aforementioned tabs, therefore, the bars do not rub or hit each other, neither on their edges nor on their flat surfaces. Another important effect is that the required silence can be ensured during assembly and disassembly of the instrument, for example, when the said assembly-disassembly activity of the instrument is carried out behind the scenes while other performers are on the stage. Removing, installing, and colliding the metal vibraphone keyboard causes an audible sound behind the scenes and on the stage that is undesirable during a performance. Another effect is that when assembling and disassembling a vibraphone, the said bar-separating tabs maintain a fixed distance between the bars, which remains the same or similar to that when the bars are placed on the vibraphone frame. Therefore, when installing the percussion keyboard, it is no longer necessary to adjust the layout of the bars—to pull and slide them when putting them on the metal holders of the keyboard, with a high risk of damaging their lower surface.

DESCRIPTION OF DRAWINGS

The invention is explained in the drawings. The drawings are an integral part of the description of the invention and are provided as a reference to a possible embodiment of the invention, but are not intended to limit the scope of the invention.

DRAWINGS—REFERENCE NUMERALS

Figure 1:
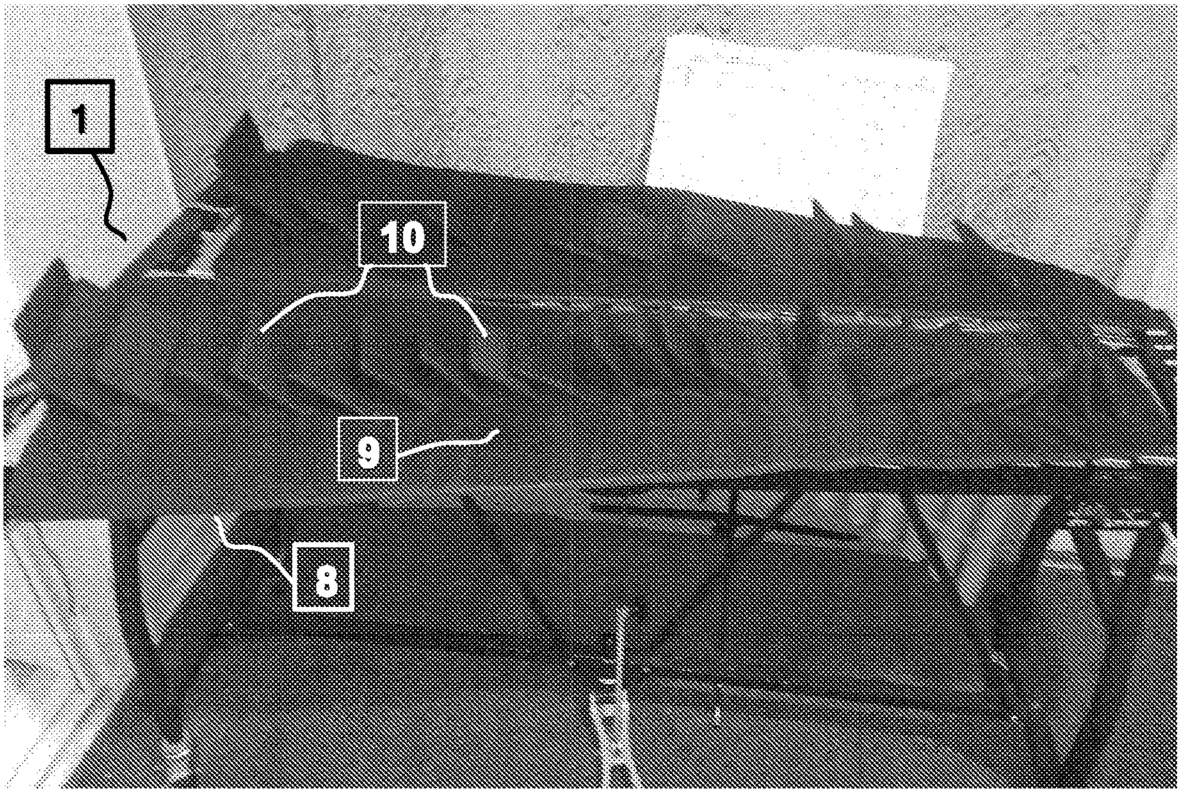
FIG. 1 The keyboard bag with the bar-separating tabs visible on its surface.

1 keyboard-percussion instrument (vibraphone);
2 the keyboard;
3 bars of the keyboard;
4 transverse holes in plates of the bars;
5 cords connecting the bars into the keyboard through the transverse holes;
6 keyboard holders on the instrument frame;
7 bar gaps;
8 bars bag;
9 the base of the bag;
10 bar-separating tabs in the bag for bar separation and protection;
10.1—side bar-separating tabs on the base to separate the keyboard tension spring from the bars;
11 means for clasping the bag;
12 tensioning spring of the keyboard.

DETAILED DESCRIPTION OF THE INVENTION

The bag (8) for the keyboard (2) of the percussion-keyboard instrument (1) is made of fabric, preferably with a soft padded base (9). The shape and size of the base (9) can vary, but in the best embodiment, the bag base (9) corresponds to the shape and size of the instrument's unfolded keyboard (2) with the outspread bars (3) and their connecting cords (5). The base (9) of the bag may be slightly larger than the unfolded keyboard (2).

Figure 2:
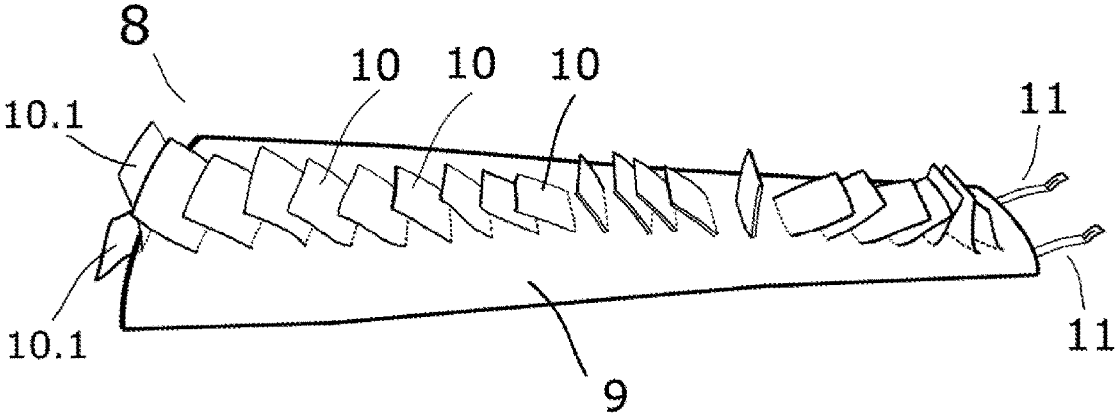
FIG. 2 The keyboard bag with the bar-separating tabs—a schematic drawing.
Figure 3:
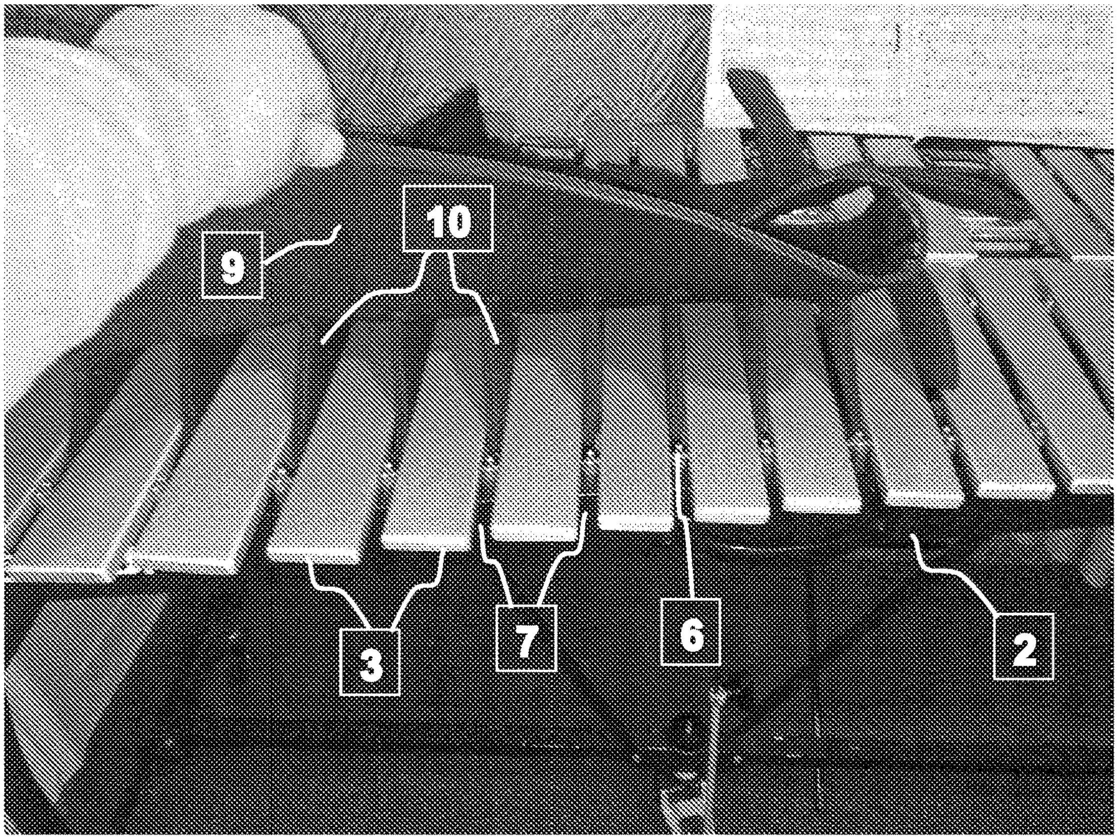
FIG. 3. Placing the bag on the keyboard by inserting the bar tabs into the gaps between the bars.

The bag has special bar-separating tabs (10) attached (sewn) to its base (9). The bag with the tabs is shown in FIGS. 1 and 2. Each of these bar-separating tabs (10) corresponds to the gap (7) on the keyboard (2) between two adjacent bars (3). That is, there are as many bar tabs (10) in the bag (8) as there are gaps (7) between the bars (3) on the keyboard (2). The width of each bar tab (10) corresponds to the distance between the transverse holes (4) in its separable adjacent bars (3). The width of the bar tab (10) may be close to or less than the distance between the holes. The height of the bar (10) is not less than or equal to the maximum thickness of the bar plate (3). Additionally, one more or two side-edge bar-separating tabs (10.1) are attached to the other side of the bag base (FIG. 2), which are provided to separate the keyboard tension metal spring (12) from its adjacent bars. The bag (8), being covered on the keyboard, is shown in FIG. 3.

Figure 5:
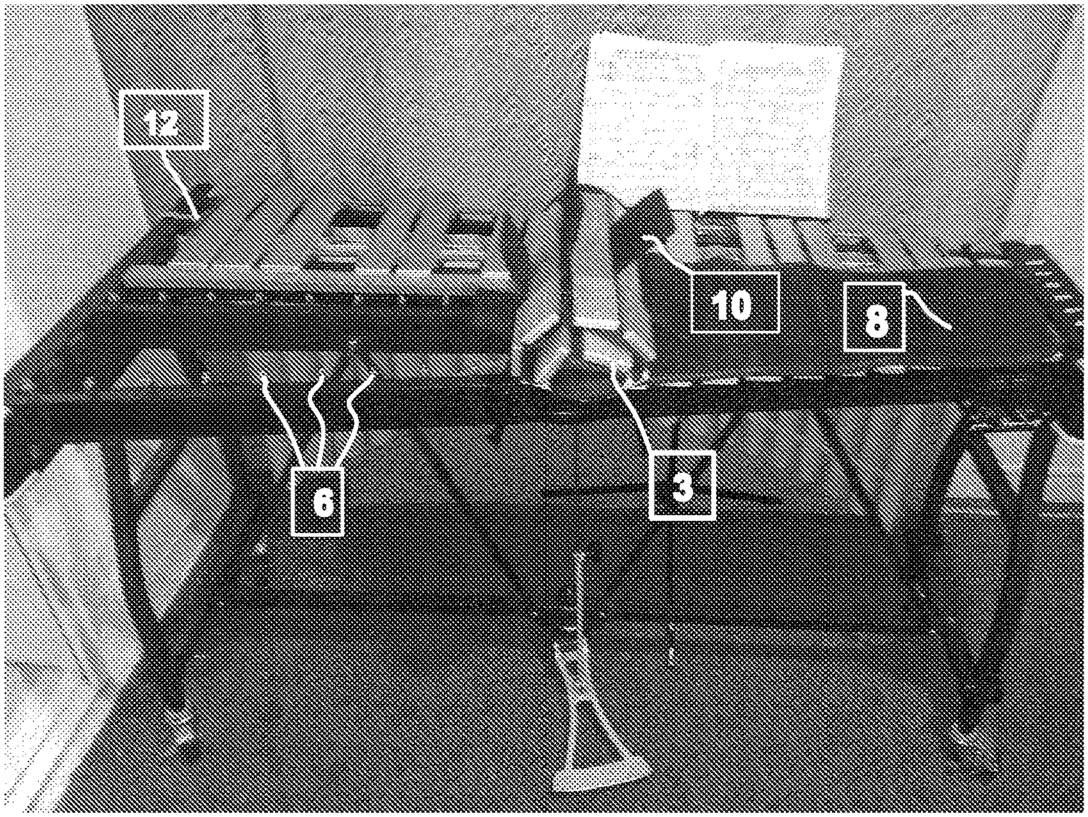
FIG. 5 The bag together with the keyboard: rolling into a roll; a half-rolled roll depicted.
Figure 6:
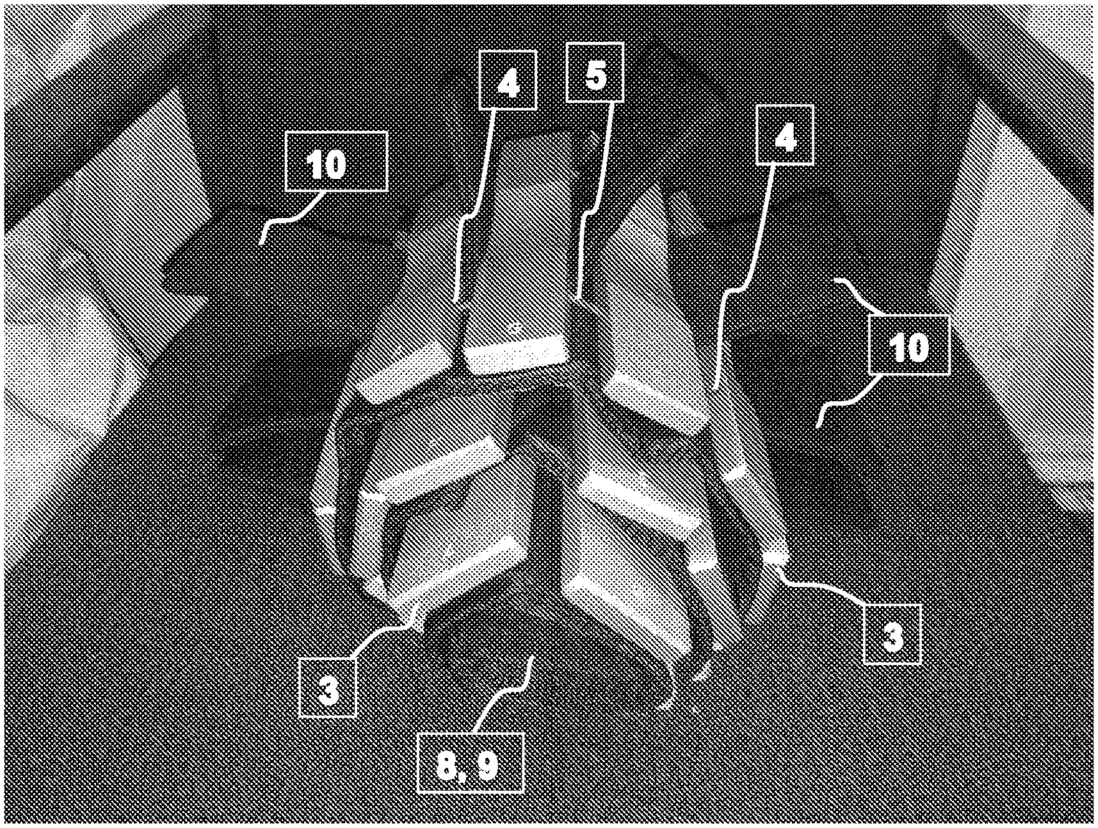
FIG. 6 The bag with the keyboard: fully wrapped into a compact roll, suitable for safe storage and transportation of the keyboard.

The bag (8) may have clasp means (11) (FIG. 2) allowing to clasp the bag (8), wrapped together with the keyboard (2), and to hold the bag in the form of a compact roll (FIGS. 5 and 6).

The base (9) of the bag (8) and the bar-separating tabs (10) are made of a strong and rigid material suitable for cases and bags for musical instruments. Also, the padding and tabs may use internal paddings, such as nonwoven technical fabric (sintepon), cotton wool, or other similar materials.

The thickness of the bar-separating tabs (10), including the layer of material and the inner padding, can be selected so that each bar-separating tab (10) fits tightly into the space between the two bar (3), the width of which is usual to such keyboards (2) mounted onto the frame of the instrument (1).

Figure 4:
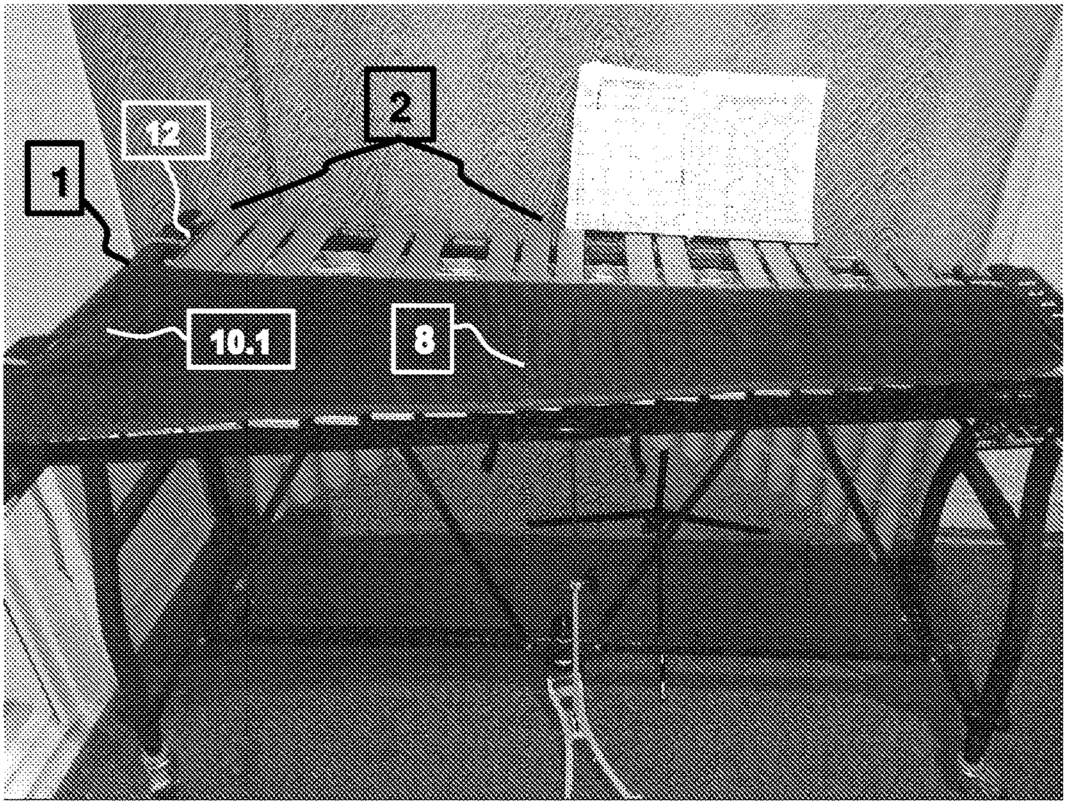
FIG. 4 The bag that covers the surface of the keyboard and protects the keyboard when the instrument is not in use.

The keyboard bag (8) can be used to cover and protect percussion keyboards and bars of the following instruments: vibraphone, marimba, xylophone, metallophone, bells, or the like. The bag (8) is suitable for the following major applications:

to cover safely the keyboard (2) of the assembled instrument (1) when the instrument is not in use, for example, when left unattended until the next day. The bar tabs (10) fit into the gaps (7) between the bars, and securely hold the bag (8) on the surface of the keyboard (2), preventing it from slipping off the keyboard (FIG. 4);

to store the keyboard, securely wrapped into a compact roll (FIGS. 5 and 6);

to transport safely the keyboard (2) wrapped into a compact roll.

The invention is not limited to the instruments, materials, and keyboard bag functionality indicated in this specification. The keyboard bag with bar tabs, for this purpose, can also be used in other suitable cases to protect musical instruments.

LIST OF NON-PATENT CITATIONS

[1] "Yamaha", Soft Cases for YM-5100A Marimba: https://www.lonestarpercussion.com/Cases-Bags/Keyboard-Soft-Cases-Bags/Yamaha-PCS-YM5100A-Soft-Cases-for-YM-5100A-Marimba.html

[2] "Pearl" marimbas and bags thereof: https://pearldrum.com/products/adams/marimbas/

The invention claimed is:

1. A keyboard bag suitable for protection of a keyboard-percussion musical instrument, wherein the instrument's keyboard comprises a plurality of plate-shaped key-bars having transverse holes through which said key-bars are capable of being connected by chords into said keyboard, whereby said keyboard can be unfolded with said chords extended, or folded, wherein the bag comprises a flat and flexible base for covering an unfolded keyboard, wherein the shape and size of said base matches or closely resembles the unfolded keyboard, and the bag further comprises a plurality of flexible key-bar-separating tabs, each tab by its single side attached inseparably to the base, and said tabs arranged for inserting into gaps between adjacent key-bars of the unfolded keyboard when the bag base is covered onto a top-surface of the unfolded keyboard, and wherein a length of each tab insertable is substantially greater than the maximum thickness of the key-bars, for wrapping the inserted tabs at least partly around each key-bar side opposite to the covered top-surface of the keyboard.

2. The bag according to claim 1, wherein the width of the key-bar-separating tabs corresponds to a distance between the transverse holes of the key-bars to be separated.

3. The bag according to claim 1, wherein the key-bar-separating tabs are inseparably attached or sewn to the base, all tabs being aligned to the same direction, for ease of inserting the tabs into the gaps between key-bars during covering the top-surface of the keyboard by the bag.

4. The bag according to claim 1, wherein the bag comprises further one or two separating tabs attached to a side-edge of the other side of the base, arranged for separating a keyboard-tension-metal-spring from its adjacent key-bars of the keyboard.

5. The bag according to claim 1, wherein the bag has fastening means for fastening the bag when the bag is wrapped together with the keyboard into a compact roll.

6. The bag according to claim 1, wherein the bag base and the key-bar-separating tabs are made of a pliable material, and comprising an internal soft padding.

7. The bag according to claim 6, wherein the thickness of the key-bar-separating tabs is selected for the key-bar-separating tabs to be insertable tightly into the gaps between the corresponding adjacent bars when the keyboard is extended by the chords and mounted on the instrument.

8. The bag according to claim 6, wherein the pliable material of the key-bar-separating tabs are made of strong and flexible fabrics.

9. A method of maintaining a keyboard of a keyboard-percussion musical instrument, wherein the keyboard comprises a plurality of plate-shaped key-bars having transverse holes through which said key-bars are connected by chords into said keyboard, whereby said keyboard can be unfolded with said chords extended, or folded, wherein the keyboard maintenance method uses a keyboard-bag comprising a flat flexible base for covering the unfolded keyboard, wherein the shape and size of said base matches or closely resembles the unfolded keyboard, and the bag further comprises a plurality of flexible kev-bar-separating tabs, each tab by its single side attached inseparably to the base, and said tabs arranged for inserting into gaps between adjacent key-bars of the unfolded keyboard when the bag base is covered onto the top-surface of the unfolded keyboard, wherein a length of each tab insertable is substantially greater than the maximum thickness of the key-bars, for wrapping the inserted tabs at least partly around each key-bar side opposite to the covered top-surface of the keyboard, wherein the keyboard maintenance method comprises:

a.) covering the top-surface of the keyboard of the assembled instrument by inserting the key-bar-separating tabs into the key-bar-gaps, to protect the keyboard when the instrument is not in use;

b.) during disassembly of the instrument, dismantling the keyboard by covering its top-surface by the bag with the key-bar-separating tabs inserted into the key-bar-gaps, and rolling the keyboard together with the bag into a compact roll, wrapping the inserted tabs underneath each key-bar, to prevent collision and ringing of the key-bars and direct contact of the key-bars mutually and with other metal parts of the instrument;

c.) during assembly of the instrument, installing the keyboard by unrolling said compact keyboard with the bag roll onto the instrument, to allocate the keyboard on the instrument, and to prevent collisions and ringing of the key-bars mutually and with other metal parts of the instrument;

d.) safely storing the keyboard wrapped into a compact roll, in which the key-bar-separating tabs of the rolled bag are inserted into the key-bar gaps and wrapped underneath each key-bar; and e.) safely transporting the keyboard wrapped into a compact roll, in which the key-bar-separating tabs of the rolled bag are inserted into the key-bar-gaps and wrapped underneath each key-bar.

10. The method according to claim 9, wherein the method is applicable; to cover, to install and dismantle, to store safely and to transport keyboards and key-bars of the following keyboard-percussion musical instruments: vibraphone, marimba, xylophone, metallophone, glockenspiel.

* * * * *